(No Model.)
J. J. RENCHARD.
LUBRICATOR.
No. 264,476. Patented Sept. 19, 1882.
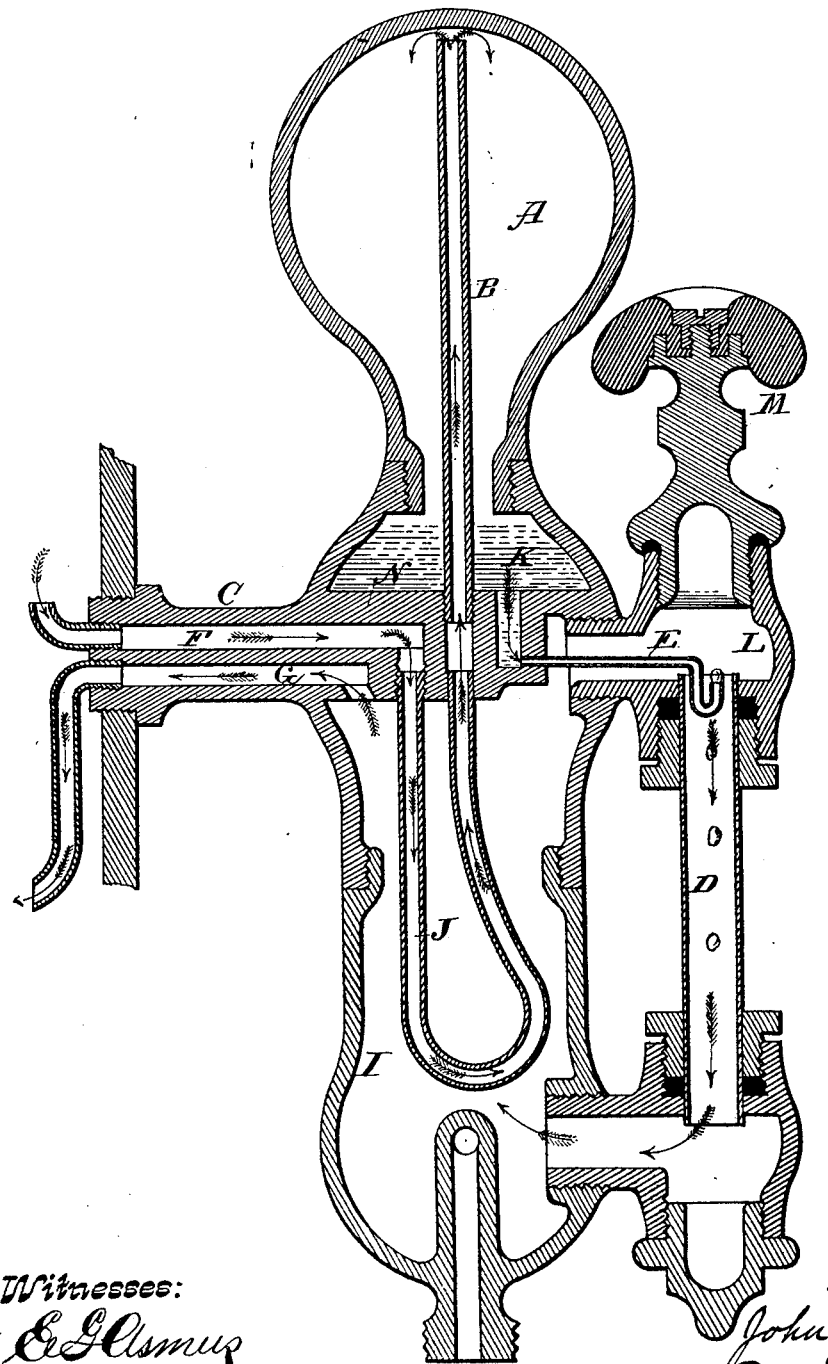
Witnesses:
E. G. Asmus
F. H. West
Inventor
John J. Ren...
By Jas. B. E...
Attorney

UNITED STATES PATENT OFFICE.

JOHN J. RENCHARD, OF DETROIT, MICHIGAN.

LUBRICATOR.

SPECIFICATION forming part of Letters Patent No. 264,476, dated September 19, 1882.

Application filed March 13, 1882. (No model.)

*To all whom it may concern:*

Be it known that I, JOHN J. RENCHARD, a citizen of the United States, residing at Detroit, in the county of Wayne and State of Michigan, have invented certain new and useful Improvements in Lubricators; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to improvements in that class of lubricators shown and described in Patent No. 191,171, granted May 22, 1877, in which class the water, in passing from the condensing-chamber to the side glass, is conducted downward and upward in a U-shaped tube within the oil-receptacle, the discharge end only of which tube extends out through the connecting-joint of the glass cage, terminating at the upper end of the side glass.

The object of my improvement is to conduct the water to the side glass by the shortest course possible, that the water will not, in its slow passage through the tube, become cooled before reaching the side glass, and at the same time to provide for heating the oil in the oil-receptacle, the latter object being accomplished by passing steam through a tube in said oil-receptacle.

My invention is further explained by reference to the accompanying drawing, which represents a vertical section of the same.

A is the condensing-chamber. B is a vertical steam-tube; C, a supporting-trunk. D is the side glass. E is the water-tube, through which the water is conducted directly from the condensing-chamber to the side glass. I is the oil-chamber. N is the diaphragm separating said chambers. K is a recess formed in said diaphragm, through which the water passes from the condensing-chamber to the water-tube E. L is a glass cage through which oil is introduced to the lubricator. M is a stopper to the oil-passage in said glass cage.

It is necessary to form a water-seal in said water-tube to prevent the oil, which is of less specific gravity than the water, from passing up through said tube into the condenser. In said previous patent the water-tube is shown depending down into the oil-receptacle, thus forming the water-seal near the center of said tube at the lower extremity of the U-shaped bend in the oil-receptacle, while, as mentioned, I form the water-seal E at the end of said tube, in the side glass tube, whereby the water is transmitted to the side glass direct before it cools, and I am enabled to keep the oil in said side glass from congealing and obstructing the view of the descending drops of water therein.

The trunk C is provided with steam-passages F and oil-passage G.

J is the steam heating-tube, one end of which is arranged in communication with the steam-passage F and the other end with the steam-tube B, while its central part depends in a U shape down into the oil-receptacle, whereby the oil therein is heated and retained at its proper temperature.

The tube E is first attached to condensing-chamber before attaching the glass cage L, when the cage is passed over the end of said tube and screwed into its seat in the ordinary manner. The side glass is then inserted and secured in the ordinary manner, as shown.

Having thus described my invention, what I claim as new, and desire to secure by Letters Patent, is—

1. The combination, in a lubricator having separate steam and oil chambers connected to each other, a side glass indicator-tube, and a single supporting-trunk, having separate steam and oil passages, of the horizontally-arranged tube E, the projecting end of which tube is so curved as to form a water-seal within said side glass, whereby the water from the condenser is led direct to said side glass, substantially as and for the purpose set forth.

2. The combination, with the steam-passage F and vertical steam-tube B, located in the condensing-chamber, of the curved steam-tube J, located in the oil-receptacle, said curved tube being interposed between said steam-passage and said vertical tube, and adapted to conduct the steam in its passage to the condenser down through the oil-receptacle, whereby the oil therein is retained at the desired temperature, as set forth.

3. The combination of trunk C, having separate steam and oil passages, tube J, communicating from the steam-passage in said trunk through the steam-tube B to the condensing-chamber, tube E, provided with a water-seal curve within said side glass, and communicating direct from said condensing-chamber to said side glass, substantially as set forth.

In testimony whereof I affix my signature in presence of two witnesses.

JOHN J. RENCHARD.

Witnesses:
HENRY C. RENCHARD,
FRANCIS J. RENCHARD.